(12) United States Patent
Sewall et al.

(10) Patent No.: US 6,935,756 B2
(45) Date of Patent: Aug. 30, 2005

(54) RETROREFLECTIVE ARTICLES HAVING MOIRE-LIKE PATTERN

(75) Inventors: Nelson D. Sewall, Forest Lake, MN (US); Kenneth L. Smith, White Bear Lake, MN (US); David W. Meitz, St. Paul, MN (US); Madeleine B. Fleming, Lake Elmo, MN (US); John C. Nelson, The Sea Ranch, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 10/167,091

(22) Filed: Jun. 11, 2002

(65) Prior Publication Data

US 2003/0227683 A1 Dec. 11, 2003

(51) Int. Cl.[7] .............................................. G02B 5/124
(52) U.S. Cl. ........................ 359/530; 359/529; 359/546
(58) Field of Search ................................. 359/529–533, 359/546–548, 850, 857

(56) References Cited

U.S. PATENT DOCUMENTS

| | | | |
|---|---|---|---|
| 835,648 A | 11/1906 | Straubel | |
| 3,057,256 A | 10/1962 | Erban | |
| 3,684,348 A | 8/1972 | Rowland | |
| 3,689,346 A | 9/1972 | Rowland | |
| 3,712,706 A | 1/1973 | Stamm | |
| 4,025,159 A | 5/1977 | McGrath | |
| 4,202,600 A | 5/1980 | Burke et al. | |
| 4,243,618 A | 1/1981 | Van Arnam | |
| 4,349,598 A | 9/1982 | White | |
| 4,478,769 A | 10/1984 | Pricone et al. | |
| 4,486,363 A | 12/1984 | Pricone et al. | |
| 4,588,258 A | 5/1986 | Hoopman | |
| 4,601,861 A | 7/1986 | Pricone et al. | |
| 4,775,219 A | 10/1988 | Appeldorn et al. | |
| 5,117,304 A | 5/1992 | Huang et al. | |
| 5,122,902 A | 6/1992 | Benson | |
| 5,156,863 A | 10/1992 | Pricone et al. | |
| 5,171,624 A | 12/1992 | Walter | |
| 5,200,851 A | 4/1993 | Coderre et al. | |
| 5,557,836 A | 9/1996 | Smith et al. | |
| 5,565,151 A | 10/1996 | Nilsen | |
| 5,624,731 A | 4/1997 | Desjardins | |
| 5,657,162 A | 8/1997 | Nilsen et al. | |
| 5,721,640 A | 2/1998 | Smith et al. | |
| 5,743,981 A | 4/1998 | Lu | |
| 5,840,406 A | 11/1998 | Nilsen | |
| 6,021,559 A | * 2/2000 | Smith | 29/557 |
| 6,036,322 A | 3/2000 | Nilsen et al. | |
| 6,155,689 A | * 12/2000 | Smith | 359/530 |
| 6,168,275 B1 | 1/2001 | Benson et al. | |
| 6,206,525 B1 | 3/2001 | Rowland et al. | |

FOREIGN PATENT DOCUMENTS

| | | |
|---|---|---|
| EP | 0 787 311 B1 | 12/1999 |
| JP | 8309851 | 11/1996 |
| WO | WO 89/06811 | 7/1989 |
| WO | WO 95/11464 | 4/1995 |
| WO | WO 99/15921 | 1/1999 |

OTHER PUBLICATIONS

Eckhardt, *Simple Model of Corner Reflector Phenomena*, Jul. 1971, vol. 10, No. 7, Applied Optics, pp. 1559–1566.

* cited by examiner

*Primary Examiner*—Audrey Chang
*Assistant Examiner*—Denise S. Allen
(74) *Attorney, Agent, or Firm*—Carolyn A. Fischer

(57) ABSTRACT

The invention relates to articles comprising a sheeting having a microstructured surface that reflects light in a moiré-like pattern. The invention further relates to methods of making a master and replicas thereof including tooling that results in sheeting having such pattern. A preferred method comprises forming V-shaped grooves in a substrate (e.g. metal plate) wherein the intersections of three grooves form cube-corner elements. The cube-corner elements are formed in such a manner that adjacent parallel grooves have substantially the same groove spacing and groove depth throughout the array. The master as well as corresponding tooling and sheeting preferably have a groove spacing within the range of about 0.0005 inches (0.0127 mm) to about 0.007 inches (0.1778 mm) throughout the array and more preferably a groove spacing of less than about 0.004 inches (0.1016 mm).

28 Claims, 2 Drawing Sheets

RETROREFLECTIVE ARTICLES HAVING MOIRE-LIKE PATTERN

FIELD OF THE INVENTION

The invention relates to articles comprising a sheeting having a microstructured surface that reflects light in a moiré-like pattern. The invention further relates to methods of making a master and replicas thereof including tooling that results in sheeting having such pattern. A preferred method comprises forming V-shaped grooves in a substrate (e.g. metal plate) wherein the intersections of three grooves form cube-corner elements. The cube-corner elements are formed in such a manner that adjacent parallel grooves have substantially the same groove spacing and groove depth throughout the array. The master as well as corresponding tooling and sheeting preferably have a groove spacing within the range of about 0.0005 inches (0.0127 mm) to about 0.007 inches (0.1778 mm) throughout the array and more preferably a groove spacing of less than about 0.004 inches (0.1016 mm).

BACKGROUND OF THE INVENTION

Retroreflective cube-corner sheeting is commonly employed for various decorative and safety purposes. Cube-corner sheeting is often preferred for such uses as traffic signs, pavement markings, vehicle markings and personal safety articles, in view of its high retroreflected brightness. Since its inception, various improvements have been made, such as described by the patent literature that relates to cube-corner retroreflective sheeting.

More recently for example, U.S. Pat. No. 6,206,525 teaches retroreflective sheeting for forming orientation free cones of reflected light encompassing a 0.5 degree angle of observation formed of small metal backed cube-corner prisms in an array in which the size of the prisms are in a range between 0.0005 inch to 0.003 inches on center. The array is formed by casting transparent plastic prisms in a mold formed by ruling three sets of grooves, which intersect at an angle. The grooves are spaced apart in the range of 0.0005 inch to 0.003 inches on center. Before or after formation, the prisms are coated with a reflective material such as a metal. The main disadvantage of very small prisms is described as being that it is very difficult to rule an array of 0.002" on center prisms over a large area, as the ruling cutting diamond wears out. However, very small prisms are described as having advantages as well, including increased flexibility.

SUMMARY OF THE INVENTION

The present inventors have found that when very small cube-corner prisms are formed from a master having precisely positioned V-shaped intersecting grooves, retroreflective masters and retroreflective replicas thereof such as retroreflective sheeting exhibit a moiré-like pattern. It is surmised that the occurrence of such moiré-like pattern is caused from optical interference between neighboring cubes (i.e. group of cubes wherein the incident light is coherent). The presence of this moiré-like pattern in the sheeting is readily apparent and can be used for various traffic control, conspicuity, and document authentication uses, particularly for instances wherein the presence of the pattern is employed in such a manner that does not detract from the legibility.

The present invention relates to retroreflective sheeting comprising a polymeric sheet having an array of geometric elements (e.g. cube-corners) wherein the sheeting comprises a moiré-like pattern. In a preferred embodiment, the elements are interconnected by a continuous land layer.

Also disclosed is a method of making a master by forming three sets of V-shaped grooves in a substrate such that the intersections form an array of cube-corner elements; wherein the grooves in each set have substantially identical groove spacing and groove depth and a groove spacing ranging from 0.0005 inches (0.0127 mm) to 0.0070 inches (0.1778 mm).

The elements are preferably formed from three sets of mutually intersecting V-shaped grooves. The grooves preferably have an average groove spacing ranging from 0.0005 inches (0.0127 mm) to 0.007 inches (0.1778 mm) and more preferably less than 0.004 inches (0.1016 mm). The cube-corners elements are substantially the same size throughout the array or sub-array.

The grooves have substantially identical spacing and depth to a groove position precision of at least +/−800 nm, typically of at least +/−500 nm, more typically of at least +/−200 nm, preferably of at least +/−100 nm, more preferably of at least +/−50 nm, even more preferably of at least +/−25 nm, and most preferably of at least +/−10 nm for a distance of 10 consecutive grooves. The cube-corner elements may be canted or uncanted.

The grooves are formed with a groove angle precision that is at least as precise as +/−2 arc minutes, preferably at least as precise as +/−1 arc minute and more preferably at least as precise as +/−½ arc minute.

Also disclosed is a method of making a tooling comprising providing a master that provides such moiré-like pattern, electroplating the master forming a negative tooling, removing the tooling from the master, optionally electroplating the negative tooling at least once forming at least one positive tooling, and optionally electroplating the positive or negative tooling forming a multigenerational tooling.

Also disclosed is a method of making a retroreflective sheeting comprising providing a tooling that provides such moiré-like pattern, casting a fluid resin composition on the microprismatic surface of the tooling, allowing the composition to harden forming a sheet, and removing the tooling. An alternate method comprises providing a tooling that provides such moiré-like pattern, providing a moldable substrate, contacting a surface of the tooling to the substrate such that the pattern is imparted on the substrate, and removing the tooling. The methods may further comprise applying a reflective coating to the resin or substrate. The resin composition is preferably transparent. A preferred resin is polycarbonate.

DETAILED DESCRIPTION OF THE PREFERRED EMBODIMENTS

Figure 1:
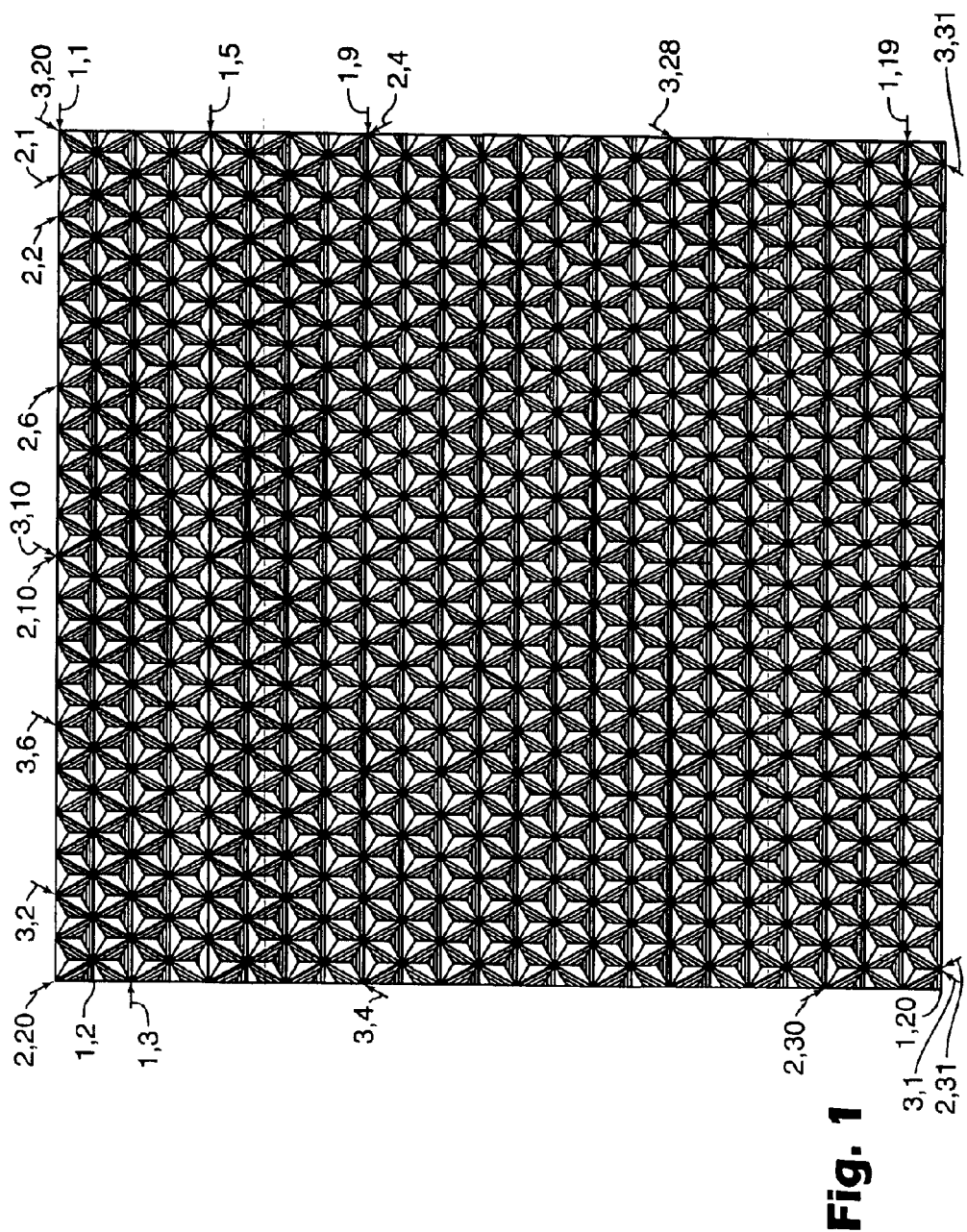
FIG. 1 depicts a magnified plan view of a portion of a master comprising three sets of V-shaped parallel grooves. An actual 6-inch-square (15.24-centimeter-square) master having a groove spacing of 0.004 inches (0.1016 mm) would have 1500 cube-corner elements along the width totaling over 2 million for the entire area. This figure also depicts an exploded view of a portion of retroreflective sheeting formed from a tool that was a negative replica of the master.

The present invention relates to masters, tooling and in particular sheeting comprising a moiré-like pattern. The invention further relates to methods of making a master and replicas thereof comprising such pattern. As used herein "moiré-like pattern" refers to the observed appearance being similar to that depicted in FIG. 2 when evaluated by shining the light from an ordinary flash light held near an observer's eyes at about the position of the nose at a distance from a retroreflective master or replica of up to about twenty feet, illuminating the retroreflective master or replica approximately normal to its plane.

The master is preferably manufactured with a groove-forming machine that employs a direct machining technique that comprises forming a pattern of grooves that mutually intersect to form cube-corner elements. The grooved substrate is referred to as a master from which a series of replicas may be formed. Examples of direct machining techniques include flycutting, milling, grinding and ruling such as described in U.S. Pat. No. 4,588,258 (Hoopman) and U.S. Pat. No. 3,712,706 (Stamm), which disclose single or multiple passes of a machine tool having two opposing cutting surfaces for cutting grooves to form cube-corner optical faces in a substrate.

Any substrate suitable for forming directly machined groove sets may be employed in the method of making the master of the invention. Suitable substrates should machine cleanly without burr formation, exhibit low ductility and low graininess and maintain dimensional accuracy after groove formation. A variety of machinable plastics or metals may be utilized. Suitable plastics comprise thermoplastic or thermoset materials such as acrylics or other materials. Machinable metals include aluminum, brass, electroless nickel alloys, and copper. Preferred metals include non-ferrous metals. Preferred machining materials are typically chosen to minimize wear of the cutting tool during formation of the grooves.

The diamond tools suitable for directly machining the groove sets are of high quality such as diamond tools that can be purchased from K&Y Diamond (Mooers, N.Y.) or Chardon Tool (Chardon, Ohio). In particular, suitable diamond tools are scratch-free within 10 mils of the tip, as can be evaluated with a 2000x white light microscope. Typically, the tip of the diamond has a flat portion ranging in size from about 0.00003 inches (0.000762 mm) to about 0.00005 inches (0.001270 mm). Further, the surface finish of suitable diamond tools preferably have a roughness average of less than about 3 nm and a peak to valley roughness of less than about 10 nm. The surface finish can be evaluated by forming a test cut in a machinable substrate and evaluating the test cut with a micro-interferometer, such as can be purchased from Wyko (Tucson, Ariz.), a division of Veeco.

Although the method of making a master in accordance with the present invention is directed toward direct machining methods, the tooling and retroreflective sheeting could be derived from a master manufactured by other methods as well provided that the precise formation of reflective geometric elements results in the occurrence of such moiré-like pattern. The resulting cube corner elements in plan view may have other shapes that are non-triangular including but not limited to trapezoids, rectangles, quadrilaterals, pentagons, or hexagons.

In a preferred method of making the master of the invention, a plurality of V-shaped grooves are formed in a substrate (e.g. metal plate). As used herein, "cutting angle" refers to the relative orientation of the groove sets with respect to each other. "Groove spacing" refers to the distance (e.g. in the x-direction) between the nadir of a groove and the nadir of an adjacent parallel groove, the nadir being the lowest point of the groove. "Groove depth" refers to the distance (e.g. in the y-direction) between the top surface of the substrate (e.g. plate) and the nadir of the groove. "Groove position" refers to the two-dimensional position of the groove. (e.g. x, y coordinates) within the master. The third dimension (e.g. z-direction) is typically constant, extending from an outer edge of the master plate to an opposing outer edge. Accordingly, the groove position is determined by the groove spacing and the groove depth. "Groove half-angle" refers to the angle formed on either side of the V-shaped groove. The groove half angles are measured relative to a reference plane that is aligned with the cutting direction and normal to the plane of the substrate. The "groove angle" is the sum of adjacent half angles sharing the same nadir.

Typically, a first set of parallel grooves are formed in a plane, as depicted by grooves 1, 1 to 1, 20 of FIG. 1; a second set of parallel grooves are formed in the plane at a cutting angle relative to the first set, as depicted by grooves 2, 1 to 2, 31 of FIG. 1; and a third set of parallel grooves are formed in the plane at a cutting angle relative to the first set, as depicted by grooves 3, 1 to 3, 31 of FIG. 1. Each set comprises a plurality of adjacent parallel grooves. As used herein "adjacent parallel groove" refers to the groove on either side in the same set. For example, an adjacent parallel groove with respect to groove 1, 2 is groove 1, 1 or 1, 3.

Each groove within a set as well as each set of grooves is typically formed at a common depth. The cutting angle is typically about 60° and specifically chosen to be a precise specified angle within the range from about 45° to about 75°. The groove angles for each groove set intersection are chosen such that the dihedral angles are about 90°, forming cube-corner elements. In the case of uncanted cubes, the nominal groove angle is the same for all three sets. Alternatively, the cube-corner elements may be canted, the groove and cutting angles being chosen such that the optical axes of the elements are tilted. An example of forward canting is described in U.S. Pat. No. 4,588,258 (Hoopman). Further, the canted or uncanted cubes may be formed such that the groove angle is varied slightly (e.g. +/−10 arc minutes) to control the spread of retroreflected light. As depicted by FIG. 1, the three sets of intersecting grooves result in an array of cube-corner elements arranged in a uniform pattern. The array preferably has substantially the maximum number of elements per area of cube-corner elements.

The V-shaped grooves are formed with a diamond-tooling machine that is capable of forming each groove with fine precision. Moore Special Tool Company, Bridgeport, Conn.; Precitech, Keene, N.H.; and Aerotech Inc., Pittsburg, Pa., manufacture suitable machines for such purpose. Such machines typically include a laser interferometer-positioning device. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco. The precision (i.e. point to point positioning) of the groove spacing and groove depth is typically at least as precise as +/−750 nm preferably at least as precise as +/−500 nm, more preferably at least as precise as +/−250 nm, and even more preferably at least as precise as +/−100 nm. Further, the resolution (i.e. ability of groove forming machine to detect current axis position) is typically at least about 10% of the precision. Hence, for a precision of +/−100 nm, the resolution is at least +/−10 nm. Over short distances (i.e. 10 adjacent parallel grooves), the precision is approximately equal to the resolution. The precision of the groove angle is typically at least as precise as +/−2 arc minutes (+/−0.033 degrees), more preferably at least as precise as +/−1 arc minute (+/−0.017 degrees), and most preferably at least at precise as +/−½ arc minute (+/−0.0083 degrees).

In order to consistently form a plurality of grooves of such fine accuracy over a duration of time, the temperature of the process is maintained within +/−0.1° C. and preferably within +/−0.01° C. Further, to maintain groove angle tolerances, all the grooves in the master are preferably initially rough cut to a depth about 10 microns shallower than the final depth and then finish cut in alternating directions. As depicted in FIG. 1, the first groove 1, 1 (i.e. first set, first groove) is finish cut. The second groove is skipped and the third groove 1, 3 is finish cut in the same manner except in the opposite direction. The fourth groove was skipped and the fifth groove 1, 5 was finish cut in the first direction, etc. until the last groove at the bottom of the plate was formed. Then the alternating (i.e. skipped even numbered) grooves were finish cut from bottom to top in the same manner. The second and third groove sets are then cut in the same fashion.

The applicants have found that when small cubes are formed in a master with such precision, the retroreflective replicas thereof (i.e. tooling and sheeting) exhibit a moiré-like pattern. For instances wherein the master is made from a suitable substrate such that the master itself is retroreflective (e.g. transparent plastic), the master will also exhibit this moiré-like pattern. For embodiments wherein a tooling is formed from a master, the pattern is replicated during the manufacture of the tooling. Further, the pattern is then replicated again when retroreflective sheeting is formed from such tooling. Thus, for embodiments wherein a negative copy tool is employed to form a positive copy retroreflective sheeting, the surface of the retroreflective sheeting is substantially the same as the master from which it was derived.

Without intending to be bound by theory, it is surmised that the presence of such moiré-like pattern is an interference effect caused by coherence of incident light illuminating on and reflecting from neighboring cubes. The area over which the light is coherent defines the size of the neighborhood and is greater than the aperture size of the cubes. The aggregate of cubes that define that neighborhood all affect the incoming light identically. Neighboring cubes have within some small fraction of a wavelength of visible light an identical, repeating geometry. The reflected electric field of the light is theorized to only differ by the position of the cubes, the sum of the fields from individual cubes giving rise to the observed moiré-like pattern.

For reasons not fully understood, the occurrence of this moiré-like pattern was not readily evident in larger cubes, having a groove spacing of 0.01 inches (0.254 mm) for example. Accordingly, the methods and articles of the present invention are primarily directed to relatively small cubes, having a groove spacing (i.e. pitch) in the range of 0.0005 inches (0.0127 mm) to 0.007 inches (0.1778 mm). Further, it is surmised that the severity of the occurrence of this moiré-like pattern tends to increase as the pitch decreases. Thus, the invention is most useful for methods of making masters and corresponding articles wherein the groove spacing is less than 0.004 inches (0.1016 mm), and preferably less than 0.0035 inches (0.0889 mm). Regardless of the technique in which the elements are formed, the lateral dimension of the elements (i.e. the size of the elements as measured between opposing sides or features) preferably ranges from 0.0005 inches (0.0127 mm) to 0.007 inches (0.1778 mm). The lateral dimension of the elements is preferably less than 0.004 inches (0.1016 mm) and more preferably less than 0.0035 inches (0.0889 mm).

The applicants have discovered that the occurrence of such pattern can be diminished or eliminated by introducing a certain magnitude and frequency of groove position variability into the method of making the master wherein the variability is intentional and controlled. Accordingly, in order to consistently produce articles having such moiré-like pattern, such variation is substantially reduced. In contrast to forming cube-corner elements having substantially different sizes, as described in U.S. Pat. No. 6,168,275 for example, in the present invention the cube-corner elements of the master, tooling and sheeting are substantially the same size throughout the array or sub-array, meaning that the smallest cube is at least 85% and preferably at least 90% of the size in comparison to the largest cube. In another regard, the active aperture of each cube in the array is substantially the same. The effective area (i.e. active aperture) for a single or individual cube corner element may be determined by, and is equal to, the topological intersection of the projection of the three cube corner surfaces on a plane normal to the refracted incident ray with the projection of the image surfaces of the third reflection on the same plane. One procedure for determining effective aperture is discussed for example by Eckhardt, Applied Optics, v. 10 n. 7 Jul. 1971, pp. 1559–1566. Straubel U.S. Pat. No. 835,648 also discusses the concept of effective area or aperture.

Typically, the grooves are formed with a diamond tool in the substrate such that the groove spacing, groove depth, and groove angle are uniform throughout each groove. The magnitude of groove position variation is equal to the precision of the groove-forming machine. Thus, the groove position variation is less than 1 micron, typically less than about 750 nm, more typically less than about 500 nm, preferably less than about 250 nm, more preferably less than about 100 nm, even more preferably less than about 50 nm, and most preferably about 10 nm to 25 nm. Accordingly, the groove position variation is sufficiently small such that the refracted light is in phase throughout the array or sub-array to the extent that can be detected by the human eye.

Depending on the substrate into which the grooves were formed, the master itself may be useful as a retroreflective article such as in the case wherein grooves are formed in a suitable transparent plastic substrate. Typically, however, the master itself is not retroreflective such as in the case of employing a metal plate as the substrate. To form a master tool of suitable size for forming retroreflective sheeting, a plurality of toolings (also referred to as tiles) are formed by electroplating the grooved surface of the master to form negative copies, subsequently electroplating the negative copies to form positive copies, electroplating the positive copies to form a second generation negative copies, etc. Electroplating techniques are generally known, such as described in U.S. Pat. Nos. 4,478,769 and 5,156,863 to Pricone et al. A master tool of the desired size can then be assembled by tiling such toolings together.

It is appreciated that the tiling process may introduce groove position variation at the interface between seamed tiles. Accordingly, it is preferred that the sub-array having the moiré-like pattern is greater than about ¼" (0.635 cm) in order that the moiré-like pattern is not diminished as a result of tiling. In the case of relatively small security markings, it is preferred that the tile is approximately equal to the size of the intended marking to insure that the pattern is not interrupted through the marking.

The retroreflective sheet is preferably manufactured as an integral material, i.e. wherein the cube-corner elements are interconnected in a continuous layer throughout the dimension of the mold, the individual elements and connections therebetween comprising the same material. The surface of the sheeting opposing the microprismatic surface is typically smooth and planar, also being referred to as the "land layer". This land layer typically has a thickness ranging from about 0.001 inches (25 microns) to about 0.006 inches (150 microns) and is preferably at least 0.002 inches (50 microns) to 0.003 inches (75 microns). Manufacture of such sheeting is typically achieved by casting a fluid resin composition onto the master tool and allowing the composition to harden to form a sheet.

Optionally, however, the grooved master(s) or positive copy(s) thereof can be used as an embossing tool to form retroreflective articles, such as described in JP 8-309851 and U.S. Pat. No. 4,601,861 (Pricone). Alternatively, the retroreflective sheeting can be manufactured as a layered product by casting the cube-corner elements against a preformed film as taught in PCT application No. WO 95/11464 and U.S. Pat. No. 3,684,348 or by laminating a preformed film to preformed cube-corner elements. In doing so the individual cube-corner elements are interconnected by the preformed film. Further, the elements and film are typically comprised of different materials.

Suitable resin compositions for the retroreflective sheeting of this invention are preferably transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index, which generally contributes to improved retroreflective performance over a wider range of entrance angles. Provided that the sheeting is reflective to the extent that the moiré-like pattern is observable under the prescribed viewing conditions, less transparent resins are also suitable for non-retroreflective uses such as security markings.

A specular reflective coating such as a metallic coating can be placed on the backside of the cube-corner elements. The metallic coating can be applied by known techniques such as vapor-depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture.

An adhesive layer also can be disposed behind the cube-corner elements or the seal film to enable the cube-corner retroreflective sheeting to be secured to a substrate. Suitable substrates include wood, aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

Colorants (e.g. pigments and/or dyes), ultraviolet light absorbers, light stabilizers, free radical scavengers, antioxidants, and other additives such as processing aids such as antiblocking agents, releasing agents, slip agents, and lubricants, may be added to the cube-corner sheeting, seal film, and adhesive layer as desired.

The articles of the invention may further comprise an additional "color layer" for increasing daytime visibility or conspicuity. Such color layers comprise at least one dye or pigment dissolved or dispersed in a polymeric matrix. A preferred color layer, particularly for conspicuity, comprises daylight fluorescent dye (i.e. a dye that emits visible light upon exposure to visible light) dissolved in a polymeric matrix. The polymeric matrix is preferably substantially transparent to visible light, particularly to light of the wavelengths emitted by the dye and light of the wavelengths that cause the dye to fluoresce. The fluorescent dye is typically selected based on the desired color, solubility with the polymeric matrix and stability in the polymeric matrix. In some instances, the dye in the color layer will preferably consist essentially of thioxanthene, thioindigoid, isovaleranthrone, a napthalamide, benzoxazole coumarin, perylene, and/or perylene imide dyes. In other instances, however, the color layer may also contain coloring agents such as pigments or other dyes in addition to those described above to adjust the color and appearance of the article.

The microstructured sheeting is useful for a variety of uses in view of the readily apparent moiré-like pattern alone or in combination with its high and often irregular retroreflected brightness. Uses for this uniquely patterned microstructured sheeting include traffic signs, pavement markings, personal safety articles, document authentication stickers and cover films, as well as commercial graphic applications including, floor graphics, vehicle advertisements, sign graphics, awning graphics, flags and banners.

In the case of wrap products, tape and decals for example, a pressure sensitive adhesive is typically applied to the opposing surface of the laminate in order to secure the laminate or article to a barrel, cone, post, roadway, license plate, barricade, or sign surface.

The moiré-like patterned sheeting is also useful in a wide variety of retroreflective safety devices including articles of clothing, construction work zone vests, personal flotation devices (e.g. lifejackets), rainwear, logos, patches, promotional items, luggage, briefcases, book bags, backpacks, rafts, canes, umbrellas, animal collars, truck markings, trailer covers and curtains, etc. The patterned sheeting may be adhered, sewn, or welded (e.g. heat, radio frequency, ultrasonic) onto such safety devices.

The coefficient of retroreflection of the retroreflective sheeting, $R_A$, as measured as recommended by CIE publication No. 54 at −4° entrance, 0° orientation, 0.2° observation is typically at least about 100 candela per lux per square meter, preferably at least about 300 candela per lux per square meter, and more preferably at least about 800 candela per lux per square meter. However, the standard deviation tends to be relatively large, ranging from about 3% to about 10% of the average due to the moiré-like pattern interfering with the ability to measure the coefficient of retroreflection.

If the article is imaged with lettering or symbols, it is preferred that the patterned sheeting is employed in a manner to enhance the conspicuity, yet not detract from the legibility. For example, the lettering may be colored, opaque, made of a different material, or that the background alone comprises the moiré-like patterned sheeting. Further, the article may have a border or frame of the patterned sheeting.

The sheeting comprising the moiré-like pattern is useful in the manufacture of various documents such as driver's licenses, license plates, passports, employee identification cards, military badges, etc. Due to the precision required to manufacture such sheeting, the pattern is difficult to counterfeit, the presence thereof useful for authenticating such articles. Once again, it is preferred that the sheeting be employed in a manner that does not detract from the legibility. It is surmised to employ the sheeting as a border or frame, position small stickers of such sheeting beneath a transparent cover film or on the outer surface of the article. For embodiments wherein the inventive sheeting, described herein, is employed as a transparent overlay to protect documents from tampering, the articles may be made as described in U.S. Pat. No. 5,743,981, incorporated herein by reference. Depending on the choice of polymeric material and the thickness of the sheeting, the patterned sheeting itself may be frangible. Another way to incorporate a small portion of the patterned sheeting is to employ a tile of the desired shape or symbol as an embossing tool for replicating the pattern in a film layer (e.g. cover film). The moiré-like patterned sheeting may also be modified such that it (retro) reflects wavelengths of light outside the visible light spectrum, such as described in U.S. Pat. No. 5,200,851.

Objects and advantages of the invention are further illustrated by the following examples, but the particular materials and amounts thereof recited in the examples, as well as other conditions and details, should not be construed to unduly limit the invention.

EXAMPLES

Example 1

A master was prepared using a 9-inch (22.86 cm) diameter by about 1 inch thick block comprised of machinable metal. The block was machined to have a 4.75 inch (12.06 cm) square portion raised by about 0.005 inches (0.127 mm). The block was positioned on a groove-forming machine having a groove space and groove depth precision (i.e. point-to-point positioning) at least as precise as +/−100 nm and a resolution (i.e. ability of the laser interferometer positioning device to detect current axis position) of at least +/−10 nm.

Several diamond tools, which can be purchased from K&Y Diamond (Mooers, N.Y.) or Chardon Tool (Chardon, Ohio), were inspected to insure that each tool was suitable. Each diamond tool was evaluated with a 2000× white light microscope to insure that within 10 mils of the diamond tip the surface was scratch free. The surface finish of each diamond tool was also inspected by forming a test cut in a machinable substrate and evaluating the test cut with a micro-interferometer obtained from Wyko under the trade designation "RST" to ensure that the roughness average was less than 3 nm and that the peak to valley roughness was less than 10 nm. The tip of the diamond had a flat portion ranging in size from 0.00003 inches (0.00076 mm) to 0.00005 inches (0.001270 mm). A suitable diamond tool was fixed on the groove-forming machine so that V-shaped grooves could be formed into the raised center portion of the block. While forming each groove in the test block and master block, the temperature of the groove forming machine, block, and diamond tool was maintained at 20° C. +/−0.01° C. The diamond tool was adjusted by making cuts in a 1-inch cube test block. The cuts in the test block were made by iteratively adjusting the diamond tool to adjust the groove angle to a tolerance of +/−30 arc seconds (0.008 degrees) and measuring the resultant angles on a precision rotary table and micro-interferometer to optically reference the plane of the groove surfaces. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco.

To maintain groove angle tolerances on the master, a diamond tool that was about 1° smaller than the smallest target groove angle was used to sequentially rough cut each groove in all three sets. Each groove was rough-cut back and forth to a depth that was 10 microns shallower than the target depth and a peak to valley surface finish of 0.000002 inches (0.000051 mm). To minimize diamond wear, the finish grooves were cut in the master in alternating directions to a peak to valley surface finish of 0.000001 inches (0.000025 mm). The first groove was finish cut in a first direction. The second groove was skipped and the third groove was finish cut in the same manner except in the opposite direction. The fourth groove was skipped and the fifth groove was finish cut in the first direction, etc., until the last groove at the bottom of the plate was formed. The diamond tool was then inspected for wear, as previously described, to insure that the average surface roughness continued to be no more than 3 nm and that the groove angle had not changed by more than 30 arc seconds (0.008 degrees). Then the alternating (i.e. skipped even numbered) grooves were finish cut from bottom to top in the same manner. The second and third groove sets were cut in the same fashion, inspecting the diamond tool prior to cutting the alternating grooves. In addition, the diamond tool was replaced and adjusted by use of the test block after each groove set.

For each of the examples, the grooves were formed with constant groove spacing in each set throughout the array. For Example A, the first groove set is cut in the master plate with a pitch (i.e. groove spacing) of 0.003200 inches (0.081280 mm), a groove angle of 67.301 degrees and a cutting angle of 0 degrees. The second groove set is cut in the master plate having a pitch of 0.003102 inches (0.078791 mm), a groove angle of 72.081 degrees and a cutting angle +61 degrees (relative to the first direction), respectively. The third groove set is cut having a pitch, groove angle and cutting angle of 0.0031 inches (0.078791 mm), 72.081 degrees and −61 degrees (relative to the first direction), respectively. The groove depth for the first, second, and third directions was chosen such that the height of each cube was about 0.001476 inches (0.037490 mm).

Figure 2:
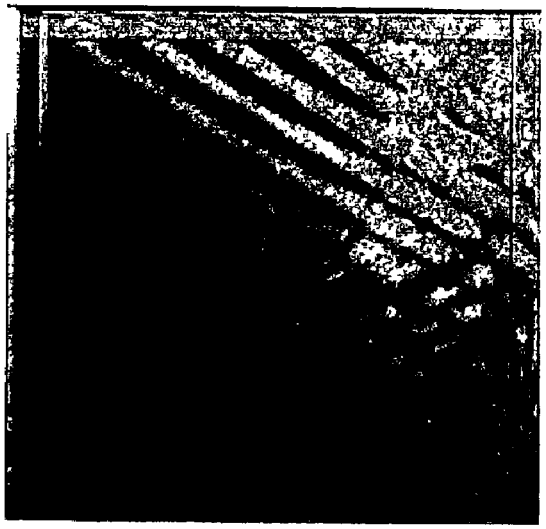
FIG. 2 depicts a photograph of a tooling having a moiré-like pattern in accordance with the present invention. The tooling was a negative replica of a master having a constant groove spacing of less than 0.003500 inches (0.088900 mm) throughout the array wherein the grooves were cut with a precision at least as precise as +/−100 nm. The photograph was taken with an Olympus C700 digital camera using the flash at a distance of about 10 feet (3 meters).

The master was removed from the groove-forming machine. Toolings were made from the master by nickel electroforming the master as described in U.S. Pat. Nos. 4,478,769 and 5,156,863. Multigenerational positive and negative copies were formed such that the tools had substantially the same degree of precise cube formation as the master. An electroformed negative tool was used to impart the pattern of the tool onto a polycarbonate film having a thickness of approximately 200 microns and having an index of refraction of about 1.59. The negative tool was observed to have a moiré-like pattern, as depicted by FIG. 2. The tool was used in a compression molding press with the pressing performed at a temperature of approximately 375° F. to 385° F., a pressure of approximately 1600 psi, and a dwell time of 20 seconds. The molded polycarbonate was then cooled to about 200° F. (100° C.) over 5 minutes. The resulting sheeting had a structured surface comprising a plurality of cube-corner elements having a constant groove spacing with the base of the elements being integrally connected in the same plane in a continuous land layer, such land layer being substantially smooth and flat on the opposing surface such that the presence of the land layer does not detract from the retroreflective properties of the sheeting.

Retroreflective sheeting having a constant groove spacing of less than 0.003500 inches (0.088900 mm), prepared in same manner described in Example 1, was evaluated by shining light from an ordinary flashlight held out from an observer's nose, illuminating the retroreflective sheeting nominally normal to its plane. From a distance of about two feet, the light that retroreflected from the sheeting exhibited a moiré-like pattern when viewed by that same observer's eyes. The moiré-like pattern was retroreflected also as seen by that observer's eyes when the flashlight was replaced by the light specified as CIE Standard Illuminant A. The moiré-like pattern was clearly visible at distances of about 100 feet. The coefficient of retroreflection, $R_A$, was measured as recommended by CIE publication No. 54 at −4° entrance, 0° orientation, 0.2° observation. The average of 9 spot readings over the entire area of the sample was 764 candelas per lux per square meter with a standard deviation of 36 candela per lux per square meter.

Example 2

The cube-corner surface of the retroreflective sheeting of Example A was coated with aluminum by vapor deposition at a thickness 950 angstroms The resulting retroreflective sheeting was evaluated in the same manner as Example A. The light that retroreflected from the sheeting was observed to exhibit the moiré-like pattern. The coefficient of retroreflection, $R_A$, was measured as recommended by CIE publication No. 54 at −4° entrance, 0° orientation, 0.2° observation. The average of 9 spot reading over the entire area of the sample was 1085 candela per lux per square meter with a standard deviation of 37 candela per lux per square meter.

Example 3

A master was made in the same manner as described in Example A. A positive copy tooling was used to form sheeting from that tooling. The cube-corner structured surface of this negative copy sheeting was coated with aluminum by vapor deposition.

The resulting retroreflective sheeting was evaluated in the same manner as Example A. The light that retroreflected from the sheeting was observed to exhibit the moiré-like pattern. The coefficient of retroreflection, $R_A$, was measured as recommended by CIE publication No. 54 at −4° entrance, 0° orientation, 0.2° observation. The average of 9 spot readings over the entire area of the sample was 1950 candela per lux per square meter with a standard deviation of 98 candela per lux per square meter.

What is claimed is:

1. Retroreflective sheeting comprising a polymeric sheet having an array of cube corner elements wherein light reflected from the array of cube corner elements comprises a moiré-like pattern.

2. The retroreflective sheeting of claim 1 wherein the cube-corner elements in plan view are triangles, trapezoids, rectangles, quadrilaterals, pentagons, or hexagons.

3. The retroreflective sheeting of claim 1 wherein the cube corner elements have a lateral dimension of less than 0.004 inches (0.1016 mm).

4. The retroreflective sheeting of claim 1 wherein the elements are interconnected by a continuous land layer.

5. The retroreflective sheeting of claim 1 wherein the elements are substantially the same size and geometry throughout the array.

6. The retroreflective sheeting of claim 1 wherein the grooves have identical spacing and depth to a groove position precision of at least +/−500 nm.

7. The retroreflective sheeting of claim 1 wherein the grooves have identical spacing and depth to a groove position precision of at least +/−200 nm.

8. The retroreflective sheeting of claim 1 wherein the grooves have identical spacing and depth to a groove position precision of at least +/−100 nm.

9. The retroreflective sheeting of claim 1 wherein the grooves have identical spacing and depth to a groove position precision of at least +/−50 nm.

10. The retroreflective sheeting of claim 1 wherein the grooves have identical spacing and depth to a groove position precision of at least +/−25 nm.

11. The retroreflective sheeting of claim 1 wherein the grooves have identical spacing and depth to a groove position precision of at least +/−10 nm for a distance of 1 consecutive grooves.

12. The method of claim 1 wherein the cube-corner elements are uncanted.

13. The method of claim 1 wherein at least a portion of the cube-corner elements are canted.

14. A method of making a master by forming three sets of V-shaped grooves in a substrate such that the intersections form an array of cube-corner elements; wherein the grooves in each set are formed with a groove position precision that is at least as precise as +/−800 nm and the grooves have substantially identical groove spacing and groove depth and the groove spacing is in the range from 0.0005 inches (0.0127 mm) to 0.0070 inches (0.1778 mm).

15. The method of claim 14 wherein the grooves have an average groove spacing of less than 0.004 inches (0.1016 mm).

16. The method of claim 14 wherein the grooves are formed with a groove position precision that is at least as precise as +/−500 nm.

17. The method of claim 14 wherein the grooves are formed with a groove position precision that is at least as precise as +/−200 nm.

18. The method of claim 14 wherein the grooves are formed with a groove position precision that is at least as precise as +/−100 nm.

19. The method of claim 14 wherein the grooves are formed with a groove position precision that is at least as precise as +/−50 nm.

20. The method of claim 14 wherein the grooves are formed with a groove position precision that is at least as precise as +/−25 nm.

21. The method of claim 14 wherein the grooves are formed with a groove position precision that is at least as precise as +/−10 nm for a distance of 10 consecutive grooves.

22. The method of claim 14 wherein the cube-corner elements are uncanted.

23. The method of claim 14 wherein at least a portion of the cube-corner elements are canted.

24. The method of claim 14 wherein the grooves are formed with a groove angle precision that is at least as precise as +/−2 are minutes.

25. The method of claim 14 wherein the grooves are formed with a groove angle precision that is at least as precise as +/−1 are minute.

26. The method of claim 14 wherein the grooves are formed with a groove angle precision that is at least as precise as +/−½ arc minute.

27. The method of claim 14 wherein the master is retroreflective.

28. The method of claim 27 wherein light reflected from the master comprises a moiré-like pattern.

* * * * *

UNITED STATES PATENT AND TRADEMARK OFFICE
CERTIFICATE OF CORRECTION

PATENT NO. : 6,935,756 B2
DATED : August 30, 2005
INVENTOR(S) : Sewall, Nelson D.

It is certified that error appears in the above-identified patent and that said Letters Patent is hereby corrected as shown below:

Column 6,
Line 29, after "7" insert -- , --.

Column 8,
Line 50, delete "lifejackets" and insert -- life jackets --, therefor.

Column 10,
Line 48, delete "0.0031" and insert -- 0.003102 --, therefor.

Column 11,
Line 31, after "thickness" insert -- of --.
Lines 58-61, delete "Retroreflective sheeting comprising a polymeric sheet having an array of cube corner elements wherein light reflected from the array of cube corner elements comprises a moiré-like pattern." and insert -- Retroreflective sheeting comprising a polymeric sheet having an array of cube corner elements formed from three sets of mutually intersecting V-shaped grooves; wherein the cube corner elements have a lateral dimension ranging from 0.0005 inches (0.0127 mm) to 0.007 inches (0.1778 mm); wherein the grooves have identical spacing and depth to a groove position precision of at least ±800nm; and wherein light reflected from the array of cube corner elements comprises a moiré-like pattern. --.

Column 12,
Line 22, after "distance of" delete "1" and insert -- 10 --, therefor.
Lines 64 and 67, delete "are" and insert -- arc --, therefor.

Column 13,
Line 3, delete "are" and insert -- arc --, therefor.

Signed and Sealed this

Twenty-fifth Day of October, 2005

JON W. DUDAS
*Director of the United States Patent and Trademark Office*